US006973575B2

(12) United States Patent
Arnold

(10) Patent No.: US 6,973,575 B2
(45) Date of Patent: Dec. 6, 2005

(54) SYSTEM AND METHOD FOR VOICE RECOGNITION PASSWORD RESET

(75) Inventor: Gordon K. Arnold, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 09/827,079

(22) Filed: Apr. 5, 2001

(65) Prior Publication Data

US 2002/0147914 A1 Oct. 10, 2002

(51) Int. Cl.[7] .......................... H04L 9/00; G06F 11/30
(52) U.S. Cl. ..................... 713/186; 713/184; 713/183; 713/182; 713/202; 713/168; 713/175
(58) Field of Search ............................... 713/186, 184, 713/183, 182, 202, 168, 175

(56) References Cited

U.S. PATENT DOCUMENTS

| | | | | |
|---|---|---|---|---|
| 5,280,581 A | | 1/1994 | Bathrick et al. | 395/200 |
| 5,611,048 A | | 3/1997 | Jacobs et al. | 395/200.09 |
| 5,991,882 A | * | 11/1999 | O'Connell | 713/201 |
| 6,073,101 A | | 6/2000 | Maes | 704/275 |
| 6,615,171 B1 | * | 9/2003 | Kanevsky et al. | 704/246 |
| 6,615,174 B1 | * | 9/2003 | Arslan et al. | 704/270 |
| 2003/0135740 A1 | * | 7/2003 | Talmor et al. | 713/186 |

FOREIGN PATENT DOCUMENTS

EP 0 454 363 A2 10/1991 ............ G06F 1/00

OTHER PUBLICATIONS

Phonologies Secure Applications, "Secure Bank-by-Phone", Jul. 2001, pp. 1-4.*

IBM Technical Disclosure Bulletin, vol. 37, No. 1, Jan. 1, 1994, p. 25-26, entitled "Network Password Reset Application".*

Phonologies Secure Applications, "Secure Bank-by-Phone", Jul. 2001, pp. 1-4.*

IBM Technical Disclosure Bulletin, "Network Password Reset Application", vol. 37, No. 1, Jan. 1, 1994, pp. 25-26.*

"Method and Apparatus for Conveniently Resetting Electronic Lock of Computer System," IBM Technical Disclosure Bulleting, Aug. 1993, pp. 83-84.

* cited by examiner

*Primary Examiner*—Matthew Smithers
*Assistant Examiner*—Courtney Fields
(74) *Attorney, Agent, or Firm*—Van Leeuwen & Van Leeuwen; Gerald R. Woods

(57) ABSTRACT

A system and method for providing a password to a user using voice recognition technology. The user's voice signature is captured and stored in order to identify the user. When the user forgets or otherwise loses a password needed to log into a computer system, he telephones a password reset system. An identifier corresponding to the user is provided by the user by using the telephone keypad or voice commands. One or more random words are requested by the password reset system. The user responds by repeating the words into the telephone receiver. The received words are matched against the user's stored voice signature to authenticate the user. If the user is authenticated, one or more desired passwords are provided to the user using a number of delivery mechanisms. If the user is not authenticated, the intrusion is logged to further maintain system security.

24 Claims, 6 Drawing Sheets

SYSTEM AND METHOD FOR VOICE RECOGNITION PASSWORD RESET

BACKGROUND OF THE INVENTION

1. Technical Field

The present invention relates in general to a method and system for improving password or PIN resets and providing new passwords or PINs to users.

2. Description of the Related Art

Help desks play a vital and important role in today's computer-based organization. Help desk personnel are often the first line of defense for answering user' questions and handling problems that users face. The help desk often aids users having difficulty with common applications, especially customized or internally developed applications that have been tailored to the organization. In addition, help desks perform other tasks such as resetting user passwords when a user forgets or otherwise loses his or her password.

Many organizations and employers utilize passwords. A user may be prompted to enter a password for a variety of reasons. Some organizations require users to enter a password for security reasons; however, organizations may require users to enter a password to verify their age or some other requirement. If the user enters their password correctly, they are allowed access to their account or other information. However, if the user enters an incorrect password, access to the account is not permitted. At this point, the user may be able to use the organization's web page to find a hint or remember for their password. If the password is entered incorrectly, the user is not permitted to access the site. Sometimes passwords are used to verify the identity of the user and may also be used to access certain files.

As much as half of the calls received by a help desk are requests for password reset. Often, these passwords can be reset using the help desk web pages; however, this may or may not require the password that needs to be reset. More often, this reset must be done by telephone. This task often requires a significant amount of time and resources by the help desk. This drain upon help desk resources often prevents help desk personnel from performing other needed functions for the organization.

Help desks often ascertain the identify of the caller requesting a password reset by asking for information that is likely known only by the user. For example, the help desk employee may ask the caller for the caller's mother's maiden name, employee number, or social security number. One challenge facing organizations and help desks, therefore, is that the information requested from the caller is often not secure. An imposter may obtain a user's mother's maiden name or other information that is used to verify a user's identity. Once the information has been obtained, the imposter can pose as the user and receive a new password for the user's account presenting further security issues for the organization.

In answer to these security issues, passwords are often not given to the caller over the telephone. Instead, they are sent using another means so that the actual user may intercept the new password before the imposter gains access to the system. For example, the password may be sent to the user's manager's email account, or if the user can receive email without the new password, to the user's own email account. However, this presents further challenges in that a genuine user (i.e., not an imposter), has to perform additional steps in order to obtain his password. These steps are often difficult if the user is traveling, especially when out of the country. Receiving the reset password from the manager may take additional time if the manager is away or unavailable. Human help desks performing password resets cause organizations to employ individuals dedicated to this function, which cause greater expenses, and consequently reduces the organizations' profits. What is needed, therefore, is a system and method of providing a password reset without the use of human intervention. What is further needed is a way to provide a new password without introducing a delay between resetting the password and the user actually receiving the new password. Finally, what is needed is a technique to deliver the new password to the user in a way that further enhances the security of the system.

SUMMARY

It has been discovered that a password can be reset and a new password can be provided using voice recognition technology. The user calls the help desk using an ordinary telephone to reach the automated password function. The voice recognition program is programmed to ask the person on the phone to identify himself by name or a user identifier and to repeat a series of random words in order to authenticate the caller. The caller repeats the words that are used for identification by simply speaking into the telephone. The use of random words, rather than a script, prevents a caller's voice from being recorded and used later to reset the password by an imposter.

Once the user has been authenticated, the automated password reset program resets the password and delivers a new password to the user in a way that further enhances the overall security of the system. One option allows the automated password reset system to call the caller back at a predetermined phone number with the new password. This would prevent someone else from intercepting the new password. Another option allows the system to deliver the new password directly to the voice mailbox of the user. This option would allow the user access to the new password regardless of time of day or location of the user. The automated password reset system could also deliver the password to a predetermined e-mail account accessible by the user or someone that the user trusts. This e-mail could be delivered directly to the user's account or could be delivered to a manager or other administrator. The new password could also be mailed to the user through traditional postal mail. Finally, the password could simply be provided to the user over the telephone after the system verified the caller's identity. This option provides a aster response to the user and, because the users identify is verified using voice recognition, reduces the possibility of providing the new password to an imposter in particular since the password is then not exposed to any other system thus reducing the chances of it being intercepted and stolen.

Another scenario is the user is at a kiosk or ATM machine, has forgotten their PIN, and uses the voice recognition program to permit the PIN to be reset. The voice recognition program permits the user to enter the new PIN, informs the owner via e-mail, post, etc. of the fact that the PIN was reset.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention that is defined in the claims following the description.

Figure 1:
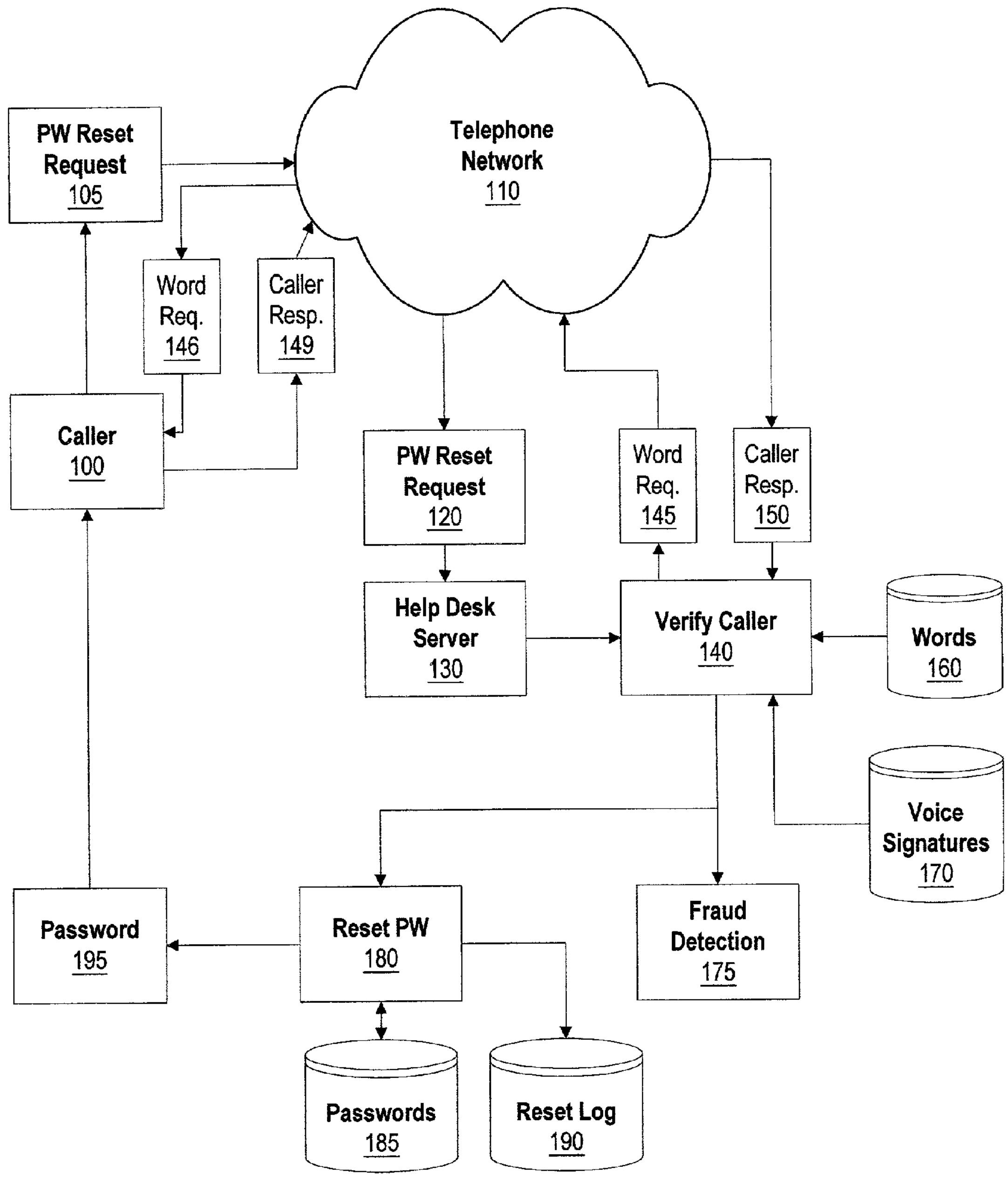
FIG. 1 is a system diagram showing components involved when requesting a password reset.

FIG. 1 is a system diagram showing components involved when requesting a password reset. ATM machines and kiosks that access secured network sites often require a user identifier and a password, or PIN number. As used herein, the term "password" includes PIN numbers and any other access code used to gain access to a computer system. In ATM machines, and some kiosks, the user identifier is supplied by the user by using an access card, similar in shape and size as a credit card, that contains user identification material. The user is required to enter a password. Telephones may be located at or near ATM and kiosks to allow customers to readily retrieve or reset passwords when they forget or lose the password. In addition, password resets may be desired by a customer if he believes that his password has become compromised. In other situations, the user may be at his home, office, or even using a mobile telephone when he realizes that he has lost or forgotten a password needed to access a particular account.

Caller 100 dials a phone number corresponding with organization's help desk and is prompted with several menu options. The caller indicates the option for password reset request 105 by pressing a predetermined number on the telephone keypad or indicating the selection verbally. Password reset request 105 is transmitted through telephone network 110 and received as password reset request 120 by help desk server 130.

Help desk server 130 likely contains many functions for assisting users, one of which is the password reset function. Help desk server 130 initiates verify caller routine 140 in response to the caller's request to reset his password. Verify caller routine 140 reads words from word data store 160. Word data store contains a list of words that the user previously recited when the user's original voice signature was recorded (see FIG. 5 for details concerning capturing the user's original voice signature). A random word is selected from word data store 160 and transmitted to caller 100 as word request 145. Word request 145 is transmitted through telephone network 110 and received as word request 146 by caller 100. In response, caller 100 repeats the word into the handset of his telephone (caller response 149). Caller response 149 is transmitted through telephone network 110 and received by verify caller function 140 as caller response 150. This process of sending word request 145 and receiving caller response 150 is repeated until verify user function 140 can determine whether the caller's voice matches the voice signature of the user stored in voice signatures 170. If verify user function 140 determines that the caller's voice does not match the user's stored voice signature, data is provided to fraud detection subsystem 175 which gathers data concerning possible fraudulent attempts to reset passwords. Fraud detection subsystem 175 may also alert the user and the user's management that someone attempted to reset the user's password. Caller identification (i.e., Caller ID) information may also be gathered about caller 100 to ascertain the identity of the caller, especially if multiple attempts are made by caller 100 to reset passwords maintained by the system.

On the other hand, if verify user function 140 determines that the caller's voice matches the user's voice signature stored in voice signatures 170, then reset password function 180 is initiated to reset the user's password. In some systems, the password may not be changed and reset password function 180 simply reads the user's current password from passwords data store 185 and provides password 195 to caller 100. In other systems, the user's password may be reset (i.e., a new password is established for the user's system identifier) and this modified password 195 is provided to caller 100. In either case, the password reset action is logged in audit trail database 190 including information such as the caller's caller id, a timestamp, and perhaps the recorded conversation. Password 100 may be provided to caller 100 in a variety of ways, such as reading the password to the user over the telephone (see FIG. 4 for detailed options regarding password delivery). After successfully resetting the password, caller 100 is able to use the information to log into one or more systems using the provided password.

Figure 2:
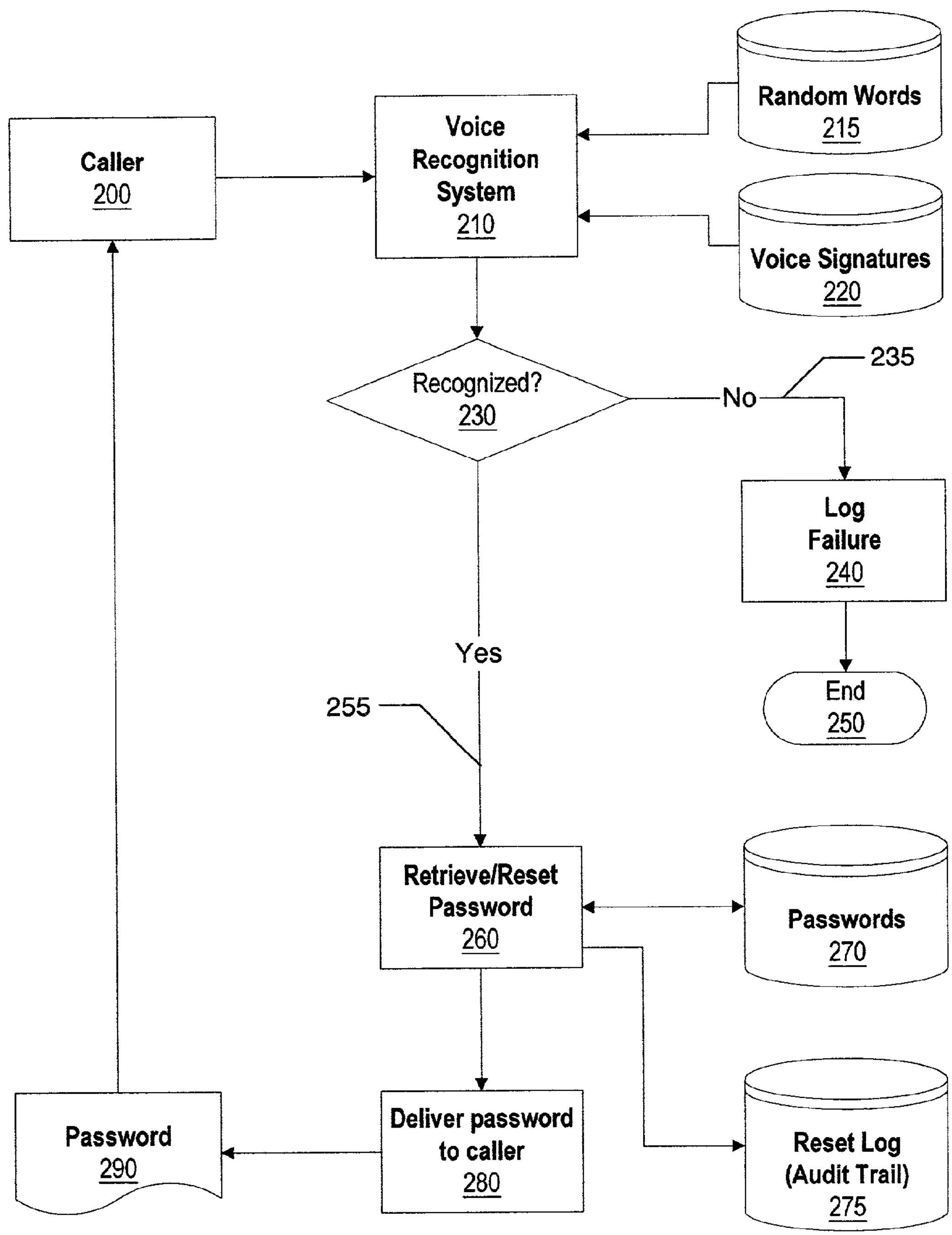
FIG. 2 is a high level flowchart showing the use of voice signatures to reset and deliver a new password to a user.

FIG. 2 is a flowchart showing the retrieval of voice signatures when a caller requests a password reset. Processing commences at 200 when the caller connects to voice recognition system 210. This connection is made when the caller uses a standard telephone to dial a telephone number corresponding to voice recognition system 210 whereupon the voice recognition system answers the incoming call and provides the user with instructions for resetting the password. This may also be reached by selecting an option from a general help desk call-in system. The caller is prompted by voice recognition system 210 to repeat a series of random words 215. The random words were previously recited by the user in another arrangement, such as a predefined script, in order to capture the user's voice signature. The user's voice signature is stored, along with other user' voice signatures, in voice signatures repository 220. Voice recognition system compares the caller's response to the series of random words with the user's voice signature in order to authenticate the caller as being the corresponding user.

If the caller's voice is not authenticated, "no" branch 235 is taken whereupon the system records logs the failed attempt (step 240) and the caller is disconnected from the system at 250. On the other hand, if the caller's voice matches the voice signature retrieved from voice signature repository 220, decision 230 branches to "yes" branch 255 and the user's password is reset (step 260). As described in FIG. 1, the password may simply be retrieved from password repository 270 or may be reset and the new password stored in password repository 270. In any event, the password corresponding with the user's system identifier (password 290)) is delivered (step 280) to caller 200. In addition, information concerning the reset transaction, including the caller's id, a timestamp, the user identifiers involved, and perhaps a recording of the callers voice are recorded in reset log database 275.

Figure 3:
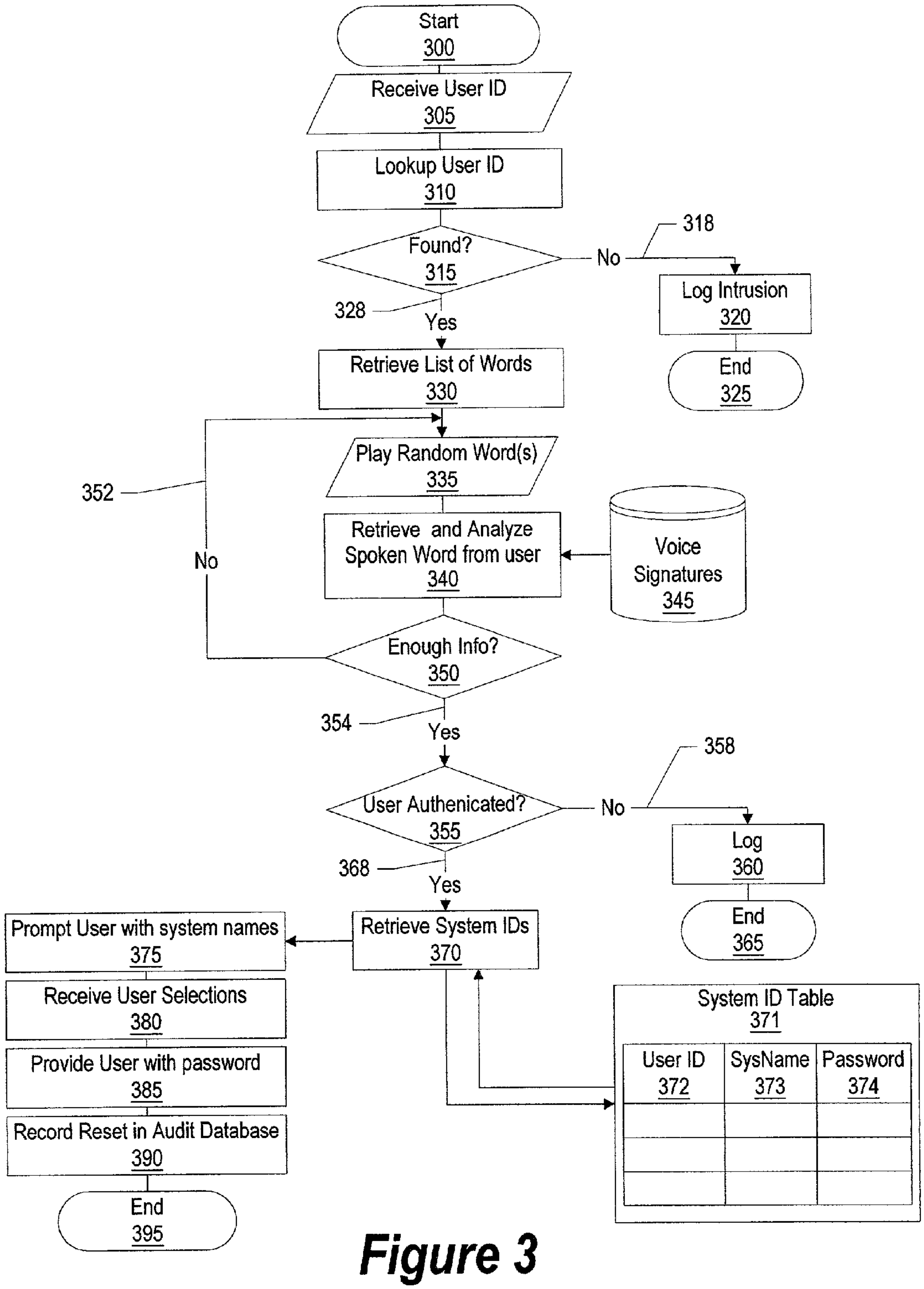
FIG. 3 is a flowchart showing authentication of a user's voice and providing the user a new password.

FIG. 3 is a flowchart showing the authentication of a user's voice and providing the user with a new password. Authentication of user's voice commences at 300 whereupon the system receives user identification 305 from user. The user can provide his identification by using the telephone keypad, by speaking the individual letters of his user id and having the system translate the spoken letters into the identifier, using a list of users, or by some other means. This identification may consist of a user id used by the user or another identifier such as the user's social security number, or employee number. The system uses the received user id to find the user from a list of valid users (step 310). A check is made to ensure that the identifier provided by user matches an identifier stored in the system (decision 315). If the system does not find a match, decision 315 branches to "no" branch 318. The system may allow the user to enter his or her identification several times in case user inadvertently entered incorrect number. However, if the user provides several consecutive incorrect identifiers, the system logs the intrusion (step 320) and processing ends at 325.

If the system matches the user's identification number, decision 315 branches to "yes" branch 328. The system retrieves a list of words (step 330) and plays random word for the user (output 335). The user is instructed to repeat the words provided by the system. The system retrieves and analyzes the words received from the user (step 340) by comparing the user's voice spoken into the telephone with the user's voice signature stored in voice signature repository 345. A determination is made as to whether enough data has been received from the caller to authenticate his voice (decision 350). If more information is required by the system to authenticate the user's voice, decision 350 branches to "no" branch 352 which loops back and plays more random word(s) (output 335) and receives and analyzes the additional input (step 340) until enough data has been gathered.

When enough information has been received and analyzed, decision 350 branches to "yes" branch 354. The system determines whether the caller's voice has been authenticated as belonging to the user based on the user's stored voice signature (decision 355). If the user is not been authenticated, "no" branch 358 is taken whereupon a system log is created (step 360) before processing ends at 365. On the other hand, if the user is authenticated, decision 355 branches to "yes" branch 368 whereupon the system retrieves system identification numbers corresponding to the user from the system identification table 371 (step 370).

System identification table 371 includes three components. User identifier 372 is the identifier the user uses (i.e., a user id) to access a particular system. This System name 373 includes system identifiers when multiple systems can be accessed by users. The user may have access to one or more system names within the organization. A password 374 is assigned to each user id/system name combination. In some environments, a policy is used to ensure that a user has different passwords for each system, while the user's user id may remain constant. In other environments, no such policy exists and the user can have the same password on multiple systems.

The system prompts the user with each system name to which the user has access within the organization (step 375). Each system name may be read to the user with a corresponding number or other means to clearly distinguish it from other system names. The user then selects one or more systems to which he needs to have his password reset (step 380). Based on the user's selections, the system generates new password(s) and delivers them to the user (step 385). Information concerning the password reset transaction, such as the user identifier(s) reset, caller identification (Caller ID) information, timestamps, and possibly recorded portions of the caller's responses are recorded in an audit database used to track password resets (step 390). Processing subsequently ends at 395.

Figure 4:
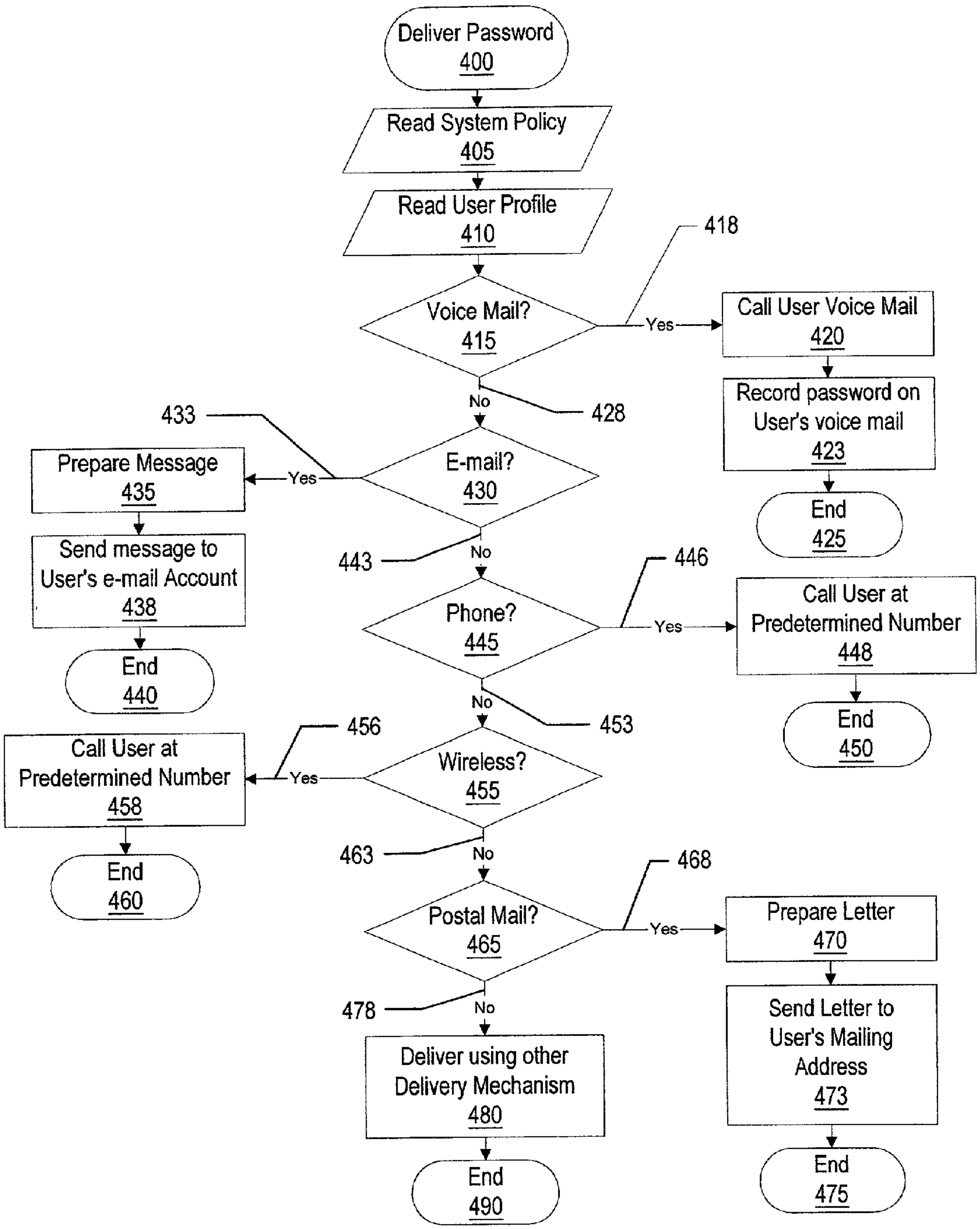
FIG. 4 is a flowchart showing the steps involved with providing the user with a new password.

FIG. 4 is a flowchart showing the steps involved with delivering a new password to a user. Processing commences at 400 whereupon processing reads system policy (input 405). The system policy is established by the organization and includes the accepted methods by which passwords can be delivered to users. The user's profile is read (input 410) to determine the delivery method selected by the user within the system policy. Based upon the system's policy and the user's profile, there may be a variety of acceptable methods to deliver a new password. A decision is made as to the delivery method chosen by the user and accepted by the organization (decision 415). If the user has selected voice mail as his or her delivery method, decision 415 branches to "yes" branch 418 whereupon the system calls the user's voice mail (step 420) and records the new password (step 423). After the password has been saved on the user's voice mail, processing ends at 425. If the user has not selected voice mail as delivery method, decision 415 branches to "no" branch 428.

If the user has selected electronic mail (email) as the delivery method, decision 430 branches to "yes" branch 433 whereupon the system prepares an email message (step 435) with new password and sends the message to the user's e-mail account (step 438). After the email message has been sent, processing ends at 440. If the user has not selected e-mail as delivery method, decision 430 branches to "no" branch 443.

If the user has selected to receive a telephone call as his or her delivery method, decision 445 branches to "yes" branch 446 whereupon the system calls the user at predetermined number (step 448), such as the user's home telephone number or the user's office number, and reads the new password to the user. After the call has been terminated, processing ends at 450. If the user has not selected to receive a telephone call as the delivery method, decision 445 branches to "no" branch 453.

If the user has selected to receive the password by means of a wireless device (i.e., pager, cellular phone, personal digital assistant) as his or her delivery method, decision 455 branches to "yes" branch 456. The system calls the user at a predetermined number (step 458) corresponding to the user's wireless device and provides the new password. After the password has been delivered, processing ends at 460. If the user has not selected to receive passwords using a wireless device, decision 455 branches to "no" branch 463.

If the user has selected to receive a letter as his or her delivery method, decision 465 branches to "yes" branch 468. The system prepares a letter (step 470) and sends it to the user's mailing address (step 473). After the letter has been sent, processing ends at 475. If the user has not selected to receive a letter as a delivery method, decision 465 branches to "no" branch 478.

The system policy may allow the user to receive the password using another delivery mechanism (step 480). For example, the policy may allow the new password to be provided on the same telephone call that the user used to request the password reset. This option would provide the user with the new password instantaneously. On the other hand, providing the user a new password using other non-instantaneous methods could provide an additional level of security. If no other delivery mechanisms are utilized and the new password has been delivered to user, processing ends at 490.

Figure 5:
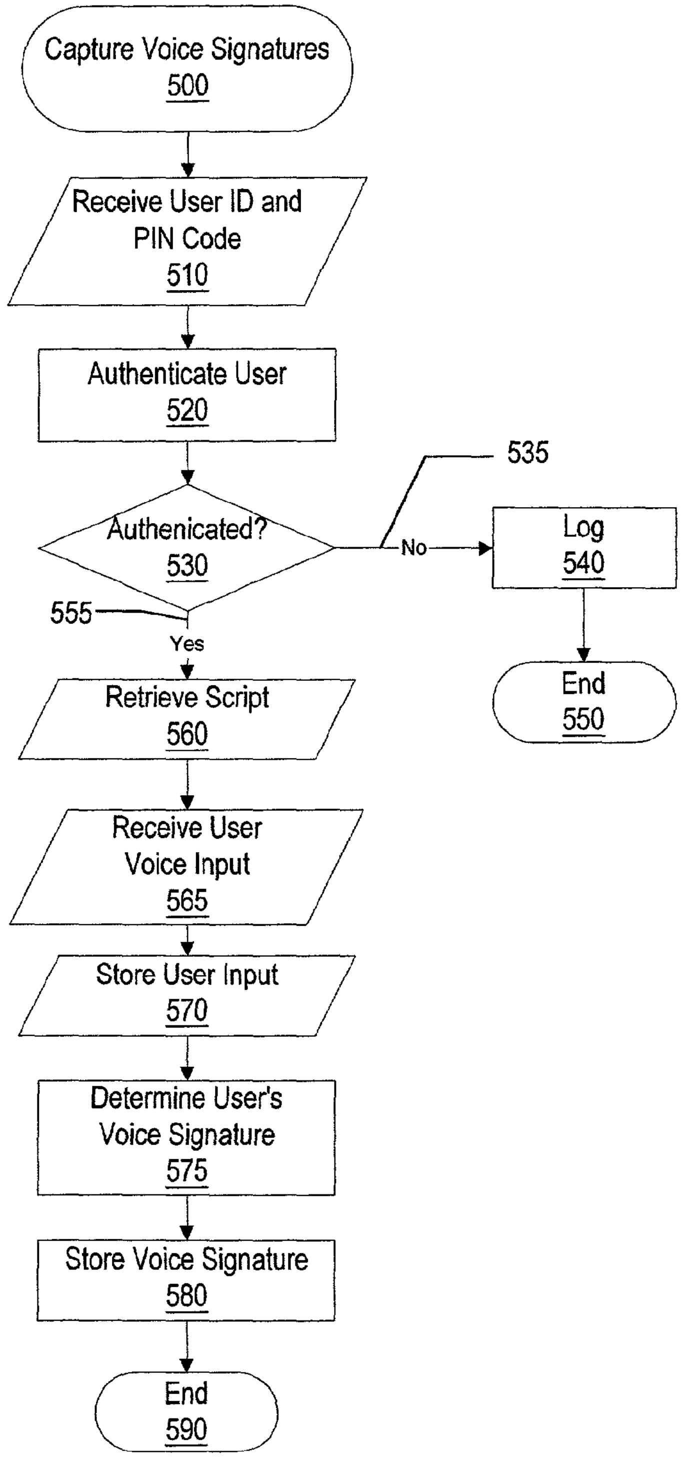
FIG. 5 is a flowchart showing the steps involved with recording the user's voice signature.

FIG. 5 is a flowchart showing the steps involved with recording the user's voice signature. The user's voice signature is captured before the user is able to reset his passwords using the voice recognition password reset function. During a subsequent password reset request, the voice signature captured using the steps shown in FIG. 5 is used to authenticate the user.

Processing commences at 500 whereupon the system receives the user's user id and personal identification number (PIN) (input 510). The organization provides the user with the user id to identify the user on one or more computer systems. The organization also provides the user with a PIN code that is used as a password to access the system used to capture the user's voice signature. In order to enhance security, it may be desirable to have the user record his voice signature at a known location that can be verified by the system. For example, the user could call the system from his office or home and the phone number used can be obtained using caller identification (i.e., Caller ID) technology and verified by matching the phone number with the user's phone number stored in the organization's directory.

Other security techniques could be used to authenticate the user may include receiving additional information (date of birth, zip code, social security number, etc.) from the user. For further security, the system could call the user back at his office or home after the receiving the user's user id and PIN. Once answered by the user, the system could ask a series of additional questions to authenticate user. Using the information provided by the user, the system authenticates the user's identity (step 520).

A determination is made as to whether the information received from the user authenticates the user (decision 530). If the user is not authenticated, decision 530 branches to "no" branch 535 whereupon a log is created (step 540) of the attempt to enter the system and processing ends at 550. If the user is authenticated, decision 530 branches to "yes" branch 555 and a script file is retrieved (input 560). The user may be asked to repeat the script after being prompted by the system or may be able to retrieve the script from a network file on the organization's intranet or from a web site belonging to the organization and accessible from the Internet. The system receives the user's voice input (input 565) in response to the user reading the script. The system stores the user's voice (input 570) in a data storage area. In order to determine the user's voice signature (step 575), the voice recognition software converts the analog signal received from telephone to a digital representation. This digital representation is stored as the user's voice signature (step 580). The voice signature may be used at a later date if the user needs to reset one of his passwords (see FIGS. 1–3). After the user's voice signature is captured, processing ends at 590.

Figure 6:
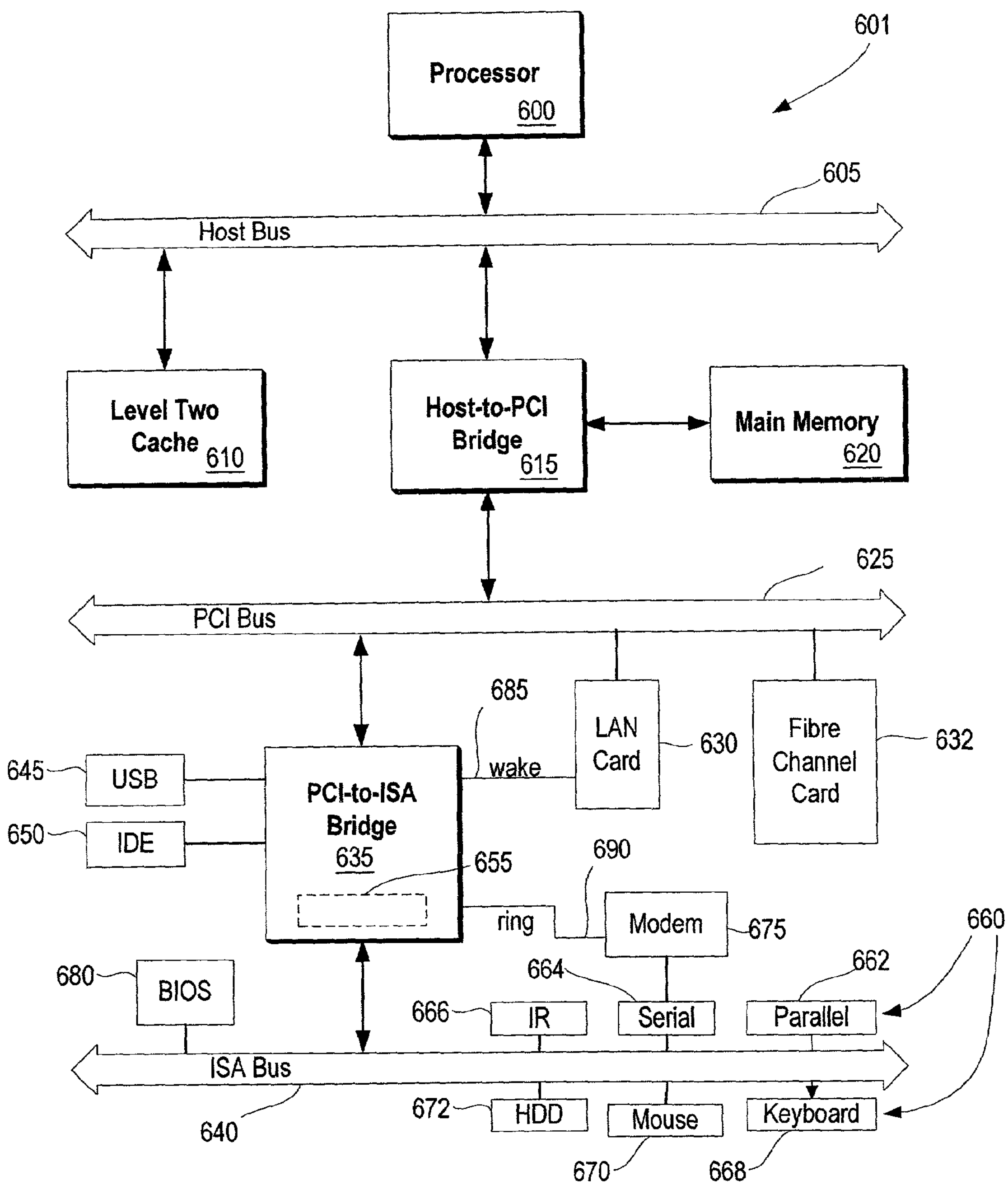
FIG. 6 is a block diagram of an information handling system capable of implementing the present invention.

FIG. 6 illustrates information handling system 601 which is a simplified example of a computer system capable of performing the mobile telephone company operations. Computer system 601 includes processor 600 which is coupled to host bus 605. A level two (L2) cache memory 610 is also coupled to the host bus 605. Host-to-PCI bridge 615 is coupled to main memory 620, includes cache memory and main memory control functions, and provides bus control to handle transfers among PCI bus 625, processor 600, L2 cache 610, main memory 620, and host bus 605. PCI bus 625 provides an interface for a variety of devices including, for example, LAN card 630. PCI-to-ISA bridge 635 provides bus control to handle transfers between PCI bus 625 and ISA bus 640, universal serial bus (USB) functionality 645, IDE device functionality 650, power management functionality 655, and can include other functional elements not shown, such as a real-time clock (RTC), DMA control, interrupt support, and system management bus support. Peripheral devices and input/output (I/O) devices can be attached to various interfaces 660 (e.g., parallel interface 662, serial interface 664, infrared (IR) interface 666, keyboard interface 668, mouse interface 670, and fixed disk (HDD) 672) coupled to ISA bus 640. Alternatively, many I/O devices can be accommodated by a super I/O controller (not shown) attached to ISA bus 640.

BIOS 680 is coupled to ISA bus 640, and incorporates the necessary processor executable code for a variety of low-level system functions and system boot functions. BIOS 680 can be stored in any computer readable medium, including magnetic storage media, optical storage media, flash memory, random access memory, read only memory, and communications media conveying signals encoding the instructions (e.g., signals from a network). In order to attach computer system 601 to another computer system to copy files over a network, LAN card 630 is coupled to PCI-to-ISA bridge 635. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the invention described herein, this computer system is simply one example of a computer system. Those skilled in the art will appreciate that many other computer system designs are capable of performing the copying process described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. For example, the bank account numbers, etc., may be placed on the preprinted checks differently depending on standards in other countries or based upon a particular situation. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of providing a user with a password, said method comprising:

receiving a call from the user;

receiving one or more spoken words from the user;

authenticating the received words using a voice signature corresponding to the user;

resetting the password in response to authenticating the received words; and delivering the password to the user in response to resetting the password.

2. The method as described in claim 1 further comprising:

receiving an identifier corresponding to the user; and validating the user based upon the identifier.

3. The method as described in claim 1 further comprising:

retrieving one or more system names in response to authenticating the user;

receiving one or more selections from the user, wherein each selection corresponds with one of the system names; and delivering the passwords corresponding to the one or more selected systems to the user.

4. The method as described in claim 1 wherein the delivering is selected from the group consisting of recording the password on a voice mail account corresponding to the user, sending the password to an email account, telephoning a predetermined telephone number and audibly providing the password, providing the password to a wireless device, mailing the password to a predetermined postal address, and providing the password to the user during the call.

5. The method as described in claim 1 further comprising:

prompting the user for one or more random words, wherein the received spoken words are in response to the prompting.

6. The method as described in claim 1 further comprising:

logging data corresponding to the call in response to not authenticating the user.

7. The method as described in claim 1 further comprising:

receiving an identifier corresponding to the user; and retrieving the voice signature from a data store including one or more voice signatures based on the received identifier.

8. The method as described in claim 1 further comprising:

receiving a voice input from the user prior to receiving the call;

determining the voice signature based upon the voice input; and storing the voice signature.

9. The method as described in claim 1 further comprising:

logging information corresponding to the call in an audit data store.

10. An information handling system comprising:

one or more processors;

a memory accessible by the processors;

a telephone interface accessible by the processors;

a nonvolatile storage device accessible by the processors; and a password reset tool for providing a user with a password, the password reset tool including:

means for receiving a call from the user to the telephone interface;

means for receiving an identifier corresponding to the user;

means for receiving one or more spoken words from the user;

means for retrieving a voice signature corresponding to the user from the nonvolatile storage device;

means for authenticating the received words using a voice signature corresponding to the user; and means for delivering the password to the user in response to authenticating the user.

11. The information handling system as described in claim 10 further comprising:

means for retrieving one or more system names in response to authenticating the user;

means for receiving one or more selections from the user, wherein each selection corresponds with one of the system names; and means for delivering the passwords corresponding to the one or more selected systems to the user.

12. The information handling system described in claim 10 further comprising:

means for prompting the user for one or more random words, wherein the received spoken words are in response to the prompting.

13. The information handling system as described in claim 10 further comprising:

means for logging data corresponding to the call in response to not authenticating the user.

14. The information handling system described in claim 10 further comprising:

means for receiving a voice input from the user prior to receiving the call;

means for determining the voice signature based upon the voice input; and means for storing the voice signature.

15. A computer program product for providing a user with a password, said me hod comprising:

means for receiving a call from the user;

means for receiving one or more spoken words from the user;

means for authenticating the received words using a voice signature corresponding to the user;

means for resetting the password in response to authenticating the received words; and means for delivering the password to the user in response to resetting the password.

16. The computer program product as described in claim 15 further comprising:

means for receiving an identifier corresponding to the user; and means for validating the user based upon the identifier.

17. The computer program product as described in claim 15 further comprising:

means for retrieving one or more system names in response to authenticating the user;

means for receiving one or more selections from the user, wherein each selection corresponds with one of the system names; and means for delivering the passwords corresponding to the one or more selected systems to the user.

18. The computer program product as described in claim 15 wherein the means for delivering is selected from the group consisting of means for recording the password on a voice mail account corresponding to the user, means for sending the password to an email account, means for telephoning a predetermined telephone number and audibly providing the password, means for providing the password to a wireless device, means for mailing the password to a predetermined postal address, and means for providing the password to the user during the call.

19. The computer program product as described in claim 15 further comprising:

prompting the user for one or more random words, wherein the received spoken words are in response to the prompting.

20. The computer program product as described in claim 15 further comprising:

means for logging data corresponding to the call in response to not authenticating the user.

21. The computer program product as described in claim 15 further comprising:

means for receiving an identifier corresponding to the user; and means for retrieving the voice signature from a data store including one or more voice signatures based on the received identifier.

22. The computer program product as described in claim 15 further comprising:

means for receiving a voice input from the user prior to receiving the call;

means for determining the voice signature based upon the voice input; and means for storing the voice signature.

23. The computer program product as described in claim 15 means for logging information corresponding to the call in an audit data store.

24. The computer program product as described in claim 15 further comprising:

means for receiving an identifier corresponding to the user; and means for identifying the password based upon the identifier.

* * * * *

UNITED STATES PATENT AND TRADEMARK OFFICE

CERTIFICATE OF CORRECTION

PATENT NO. : 6,973,575 B2
DATED : December 6, 2005
INVENTOR(S) : Arnold

It is certified that error appears in the above-identified patent and that said Letters Patent is hereby corrected as shown below:

<u>Column 3,</u>
Line 46, delete “with” and insert -- with the --.

<u>Column 4,</u>
Line 57, delete “records logs” and insert -- records/logs --.

<u>Column 6,</u>
Line 32, delete “with new” and insert -- with the new --.

<u>Column 7,</u>
Line 28, delete “user may” and insert -- user, and may --.

<u>Column 10,</u>
Line 48, delete “me hod” and insert -- computer program product --.

<u>Column 12,</u>
Line 15, delete “15” and insert -- 15 further comprising --.

Signed and Sealed this

Eleventh Day of April, 2006

JON W. DUDAS
*Director of the United States Patent and Trademark Office*